(12) United States Patent
Rahafrooz et al.

(10) Patent No.: US 11,725,941 B2
(45) Date of Patent: Aug. 15, 2023

(54) SENSING DEVICE

(71) Applicant: Panasonic Intellectual Property Management Co., Ltd., Osaka (JP)

(72) Inventors: Amir Rahafrooz, Shaker Heights, OH (US); Diego Emilio Serrano, Peachtree City, GA (US); Ijaz Hussain Jafri, Holliston, MA (US)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 99 days.

(21) Appl. No.: 17/420,751

(22) PCT Filed: Dec. 27, 2019

(86) PCT No.: PCT/JP2019/051459
§ 371 (c)(1),
(2) Date: Jul. 6, 2021

(87) PCT Pub. No.: WO2020/145203
PCT Pub. Date: Jul. 16, 2020

(65) Prior Publication Data
US 2022/0107181 A1 Apr. 7, 2022
US 2022/0316881 A9 Oct. 6, 2022

Related U.S. Application Data

(60) Provisional application No. 62/789,550, filed on Jan. 8, 2019, provisional application No. 62/789,549, filed
(Continued)

(51) Int. Cl.
*G01C 19/5712* (2012.01)
*G01P 1/00* (2006.01)
*G01P 15/125* (2006.01)

(52) U.S. Cl.
CPC ........... *G01C 19/5712* (2013.01); *G01P 1/00* (2013.01); *G01P 15/125* (2013.01)

(58) Field of Classification Search
CPC ... G01C 19/5712; G01C 19/5755; G01P 1/00; G01P 15/125; G01P 15/097
See application file for complete search history.

(56) References Cited

U.S. PATENT DOCUMENTS 4,872,342 A * 10/1989 Hanson ............... G01P 15/0888
29/595
5,528,937 A * 6/1996 Dufour .................. G01P 15/18
73/514.32
(Continued)

FOREIGN PATENT DOCUMENTS

CN 108955662 A 12/2018

OTHER PUBLICATIONS

The Extended European Search Report dated Jun. 21, 2022 for the related European Patent Application No. 19908106.8.
(Continued)

*Primary Examiner* — David J Bolduc
(74) *Attorney, Agent, or Firm* — Pearne & Gordon LLP

(57) ABSTRACT

A sensing device includes a resonant member that is movable in a first mode and a second mode, and an electrode. The resonant member has a capacitive surface portion that faces and is capacitively coupled to a capacitive surface portion of the electrode. Displacement for each point along the capacitive surface portion of the resonant member in the first mode is substantially tangent to the point.

17 Claims, 7 Drawing Sheets

Related U.S. Application Data on Jan. 8, 2019, provisional application No. 62/789,548, filed on Jan. 8, 2019.

(56) References Cited

U.S. PATENT DOCUMENTS

| | | | |
|---|---|---|---|
| 5,535,902 A * | 7/1996 | Greiff | G01P 15/0802 216/2 |
| 5,635,640 A * | 6/1997 | Geen | H02N 1/008 310/309 |
| 5,650,568 A | 7/1997 | Greiff et al. | |
| 6,062,082 A * | 5/2000 | Guenther | G01C 19/5712 73/504.03 |
| 6,067,858 A | 5/2000 | Clark et al. | |
| 6,076,401 A * | 6/2000 | Okada | G01C 19/5712 73/504.12 |
| 6,367,326 B1 * | 4/2002 | Okada | G01C 19/5712 73/504.12 |
| 6,443,008 B1 | 9/2002 | Funk et al. | |
| 7,543,496 B2 | 6/2009 | Ayazi et al. | |
| 7,578,189 B1 | 8/2009 | Mehregany | |
| 7,892,876 B2 | 2/2011 | Mehregany | |
| 8,166,816 B2 | 5/2012 | Ayazi et al. | |
| 8,173,470 B2 | 5/2012 | Mehregany | |
| 8,205,497 B1 * | 6/2012 | Okandan | G01C 19/5712 73/514.26 |
| 8,372,677 B2 | 2/2013 | Mehregany | |
| 8,528,404 B2 | 9/2013 | Ayazi | |
| 9,923,545 B2 | 3/2018 | Clark | |
| 10,921,123 B2 * | 2/2021 | Wen | H03H 9/02338 |
| 11,137,250 B2 * | 10/2021 | Wen | H03H 9/02228 |
| 2006/0053888 A1 * | 3/2006 | Sugimori | G01P 15/18 73/514.16 |
| 2009/0064780 A1 * | 3/2009 | Coronato | G01P 15/125 73/504.08 |
| 2009/0205423 A1 * | 8/2009 | Takagi | G01C 19/5755 73/504.12 |
| 2010/0126269 A1 * | 5/2010 | Coronato | G01C 19/56 73/504.04 |
| 2010/0126272 A1 * | 5/2010 | Coronato | G01C 19/5712 29/829 |
| 2013/0086985 A1 * | 4/2013 | Lin | G01C 19/5712 73/504.12 |
| 2014/0224016 A1 * | 8/2014 | Leclerc | G01C 19/5712 73/504.12 |
| 2014/0352431 A1 * | 12/2014 | Leclerc | G01P 15/18 73/504.04 |
| 2015/0211855 A1 * | 7/2015 | Ruohio | G01C 19/5712 73/504.12 |
| 2016/0164458 A1 | 6/2016 | Nguyen et al. | |
| 2019/0346266 A1 * | 11/2019 | Kuisma | G01C 19/5684 |

OTHER PUBLICATIONS

Hansong Zeng et al: "Sensing Movement: Microsensors for Body Motion Measurement", Sensors, vol. 11, No. 12, Jan. 10, 2011 (Jan. 10, 2011), pp. 638-660, XP055101340.

International Search Report issued in Patent Application No. PCT/JP2019/051459 dated Feb. 4, 2020.

Written Opinion issued in Patent Application No. PCT/JP2019/051459 dated Feb. 4, 2020.

* cited by examiner

SENSING DEVICE

TECHNICAL FIELD

This application relates generally to a sensing device and more particularly, a sensing device such as a MEMS gyroscope or MEMS accelerometer.

BACKGROUND ART

Inertial measurement devices, such as gyroscopes and accelerometers, provide high-precision sensing. However, historically their cost, size, and power requirements have prevented their widespread use in industries such as consumer products, gaming devices, automobiles, and handheld positioning systems.

More recently, micro-electro-mechanical systems (MEMS) sensor devices have been gaining increased attention from multiple industries since micro-machining technologies have made fabrication of miniature gyroscopes and accelerometers possible. Miniaturization also enables integration of MEMS devices with readout electronics on the same die, resulting in reduced size, cost, and power consumption as well as improved resolution by reducing noise. Consumer products such as digital cameras, 3D gaming equipment, and automotive sensors are employing MEMS devices because of their numerous advantages. The demand for low cost, more sophisticated, and user-friendly devices by the consumers has caused a steep rise in the demand of MEMS sensors, as they offer adequate reliability and performance at very low prices. State-of-the-art MEMS devices, such as those disclosed in U.S. Pat. Nos. 7,543,496; 7,578,189; 7,892,876; 8,173,470; 837,267; 8,528,404; and 8,166,816, are able to sense rotational (i.e. angle or angular velocity of rotation around an axis) or translational motion (i.e. linear acceleration along an axis) around and along axes. These devices typically include a resonant member surrounded by a plurality of electrodes that are spaced from the resonator by a capacitive gap. For instance, a sensing device 110 is illustrated in FIG. 12 that corresponds to a MEMS gyroscope, and includes a resonant member 112 and a plurality of electrodes 118 that are spaced from the resonant member 112. Each electrode 118 is capacitively coupled to the resonant member 112. More specifically, the resonant member 112 has a plurality of capacitive surface portions 122 that each face and is capacitively coupled to an associated capacitive surface portion 128 of an electrode 118. A capacitive channel 130 is thereby defined between the resonant member 112 and each electrode 118.

The resonant member 112 is movable in two resonant modes—a drive mode and a sense mode. In particular, two of the electrodes 118a, 118c are drive electrodes that are operable to apply a driving force to the resonant member 112 in an X direction so as to excite the resonant member 112 and vibrate the resonant member 112 in the drive mode at a given frequency (e.g., a natural frequency of the resonant member 112). If the resonant member 112 is rotated, the Coriolis Effect will transfer energy from the drive mode to the sense mode and cause the resonant member 112 to vibrate in the sense mode. Moreover, two of the electrodes 118b, 118d are sense electrodes that are configured to generate a current in response to sense-mode movement of the resonant member 112 in a Y direction that is perpendicular to the X direction. This current can thus be analyzed to determine the rotation rate of the resonant member 112.

Each electrode 118 is aligned with a node axis of the resonant member 112 (for the purposes of this disclosure, a "node axis" of a resonant member is an axis that passes through two or more node points of the resonant member, and a "node point" refers to either an antinode or node of the resonant member when vibrating in the drive mode or sense mode). More specifically, the drive electrodes 118a, 118c are aligned with a first node axis $N_1$ that passes through two node points 134a, 134c of the resonant member 112, and the sense electrodes 118b, 118d are aligned with a second node axis $N_2$ that passes through two other node points 134b, 134d of the resonant member 112. The two node points 134a, 134c correspond to nodes of the resonant member 112 in sense mode and antinodes of the resonant member 112 in drive mode, while the other two node points 134b, 134d correspond to antinodes of the resonant member 112 in sense mode and nodes of the resonant member 112 in drive mode. Moreover, the capacitive surface portions 122, 128 of the resonant member 112 and electrodes 118 are preferably shaped and arranged such that their capacitive channels 130 are symmetrical about their associated node axes.

Ideally, the sense mode will not be excited when the resonant member 112 is under zero rate (i.e., no rotation), such that sense-mode movement of the resonant member 112 in the Y direction is zero and no current output is generated at the sense electrodes 118b, 118d that would falsely indicate rotation. However, as discussed further below, some excitation of the sense electrodes 118b, 118d can occur even when the resonant member 112 is under zero rate.

For example, the sensing device 110 in FIG. 12 is typically manufactured using a deep reactive ion etching (DRIE) process that divides a single body of material into the resonant member 112 and electrodes 118. The capacitive channels 130 are formed at the locations of the single body that are etched, along with the capacitive surface portions 122, 128 of the resonant member 112 and electrodes 118. As noted above, the capacitive surface portions 122, 128 of the resonant member 112 and electrodes 118 are preferably shaped and arranged such that their capacitive channels 130 are symmetrical about their associated node axes. However, due to imperfections that arise in the DRIE process when forming the ends of each channel 130, the capacitive surface portions 122, 128 can have imperfections at the ends of each channel 130 that result in asymmetries of the channel 130 about its associated node axe.

FIG. 13 shows an example wherein an imperfection 142 is formed in the capacitive surface portion 128b of the sense electrode 118b such that its capacitive channel 130b is not symmetrical about the second node axis $N_2$. When the drive electrodes 118a, 118c are operated to excite the resonant member 112 in drive mode, some drive mode movement will be experienced at the capacitive surface portion 122b of the resonant member 112 (see e.g., broken line 146 in FIG. 13 indicating drive-mode movement of the resonant member 112). If the capacitive channel 130b for the sense electrode 118b was symmetrical about the second node axis $N_2$, the total capacitive displacement of the capacitive surface portion 122b would be zero, thereby resulting in a zero current at the sense electrode 118b. However, because the capacitive channel 130b is not symmetrical, total capacitive displacement of the capacitive surface portion 122b will be non-zero, thereby producing a zero-rate output (ZRO) at the sense electrode 118b that falsely indicates rotation of the resonant member 112 and can change over time and temperature. Additionally, if there is asymmetry in one or both of the capacitive channels 130a, 130c for the drive electrodes 118a, 118c, this asymmetry can cause the drive electrodes 118a, 118c to also excite sense-mode movement of the resonant member 112 under zero rate, which can further produce a ZRO at the sense electrodes 118b, 118d (even if the capacitive channels 130b, 130d for the sense electrodes 118b, 118d are perfectly symmetrical).

CITATION LIST

Patent Literature

[PTL 1] U.S. Pat. No. 7,543,496
[PTL 2] U.S. Pat. No. 7,578,189
[PTL 3] U.S. Pat. No. 7,892,876
[PTL 4] U.S. Pat. No. 8,173,470
[PTL 5] U.S. Pat. No. 8,372,677
[PTL 6] U.S. Pat. No. 8,528,404
[PTL 7] U.S. Pat. No. 8,166,816,

SUMMARY OF INVENTION

The following presents a simplified summary of example embodiments of the invention. This summary is not intended to identify critical elements of the invention or to delineate the scope of the invention. The sole purpose of the summary is to present some example embodiments in simplified form as a prelude to the more detailed description that is presented later.

In accordance with a first aspect, a sensing device includes a resonant member that is movable in a first mode and a second mode, and an electrode. The resonant member has a capacitive surface portion that faces and is capacitively coupled to a capacitive surface portion of the electrode. Displacement for each point along the capacitive surface portion of the resonant member in the first mode is substantially tangent to the point.

In one example of the first aspect, the capacitive surface portion of the resonant member is curved.

In another example of the first aspect, the capacitive surface portion of the resonant member is concave.

In yet another example of the first aspect, the capacitive surface portion of the resonant member is convex.

In still yet another example of the first aspect, the resonant member includes a main body and a projection that is integrally connected to and projects from the main body, and the projection defines the capacitive surface portion of the resonant member. In one example, the projection extends from the main body along a node axis of the resonant member, the projection includes a proximal end portion and a distal end portion, the distal end portion being wider than the proximal end portion, and the distal end portion defines the capacitive surface portion of the resonant member. In one example, the proximal end portion of the projection is connected to a portion of the main body that displaces in a direction substantially parallel to the node axis in the second mode.

In another example of the first aspect, the resonant member includes a main body and the capacitive surface portion of the resonant member is a recessed surface portion of the main body. In yet another example of the first aspect, the sensing device includes a substrate; an anchor that supports the resonant member relative to the substrate; and a decoupling mechanism for flexibly decoupling the resonant member from the anchor. The decoupling mechanism includes a flange connected to the anchor, a ring portion, a plurality of first elastic portions that connect the ring portion to the flange, and a plurality of second elastic portions that connect the ring portion to the resonant member. Each of the first elastic portions has a stiffness that is less than a stiffness of each second elastic members.

In yet another example of the first aspect, a gyroscope includes the sensing device.

In accordance with a second aspect, a sensing device includes a resonant member that is movable in a first mode and a second mode, and an electrode. The electrode is located between two capacitive surface portions of the resonant member such that one of the resonant member's two capacitive surface portions faces and is capacitively coupled to one capacitive surface portion of the electrode and the other of the resonant member's two capacitive surface portions faces and is capacitively coupled to another capacitive surface portion of the electrode. Displacement for each point along each of the two capacitive surface portions of the resonant member is substantially tangent to the point in the first mode.

In one example of the second aspect, the electrode and resonant member define a capacitive channel therebetween, and the two capacitive surface portions of the resonant member respectively define two end portions of the capacitive channel.

In another example of the second aspect, the resonant member includes a main body and two projections that are integrally connected to and project from the main body, and the electrode is located between the two projections. One of the two projections defines one of the two capacitive surface portions of the resonant member, and the other of the two projections defines the other of the two capacitive surface portions of the resonant member.

In yet another example of the second aspect, the resonant member includes a main body and each capacitive surface portion of the resonant member corresponds to a recessed surface portion of the main body.

In still yet another example of the second aspect, the electrode is located along a node axis of the resonant member.

In accordance with third aspect, a sensing device includes a resonant member that is movable in a first mode and a second mode, the resonant member including a main body and a projection that extends from the main body along a node axis of the resonant member. The projection includes a proximal end portion and a distal end portion, the distal end portion being wider than the proximal end portion.

In one example of the third aspect, the sensing device includes an electrode that is aligned with the projection along the node axis, wherein the proximal end portion of the projection defines a capacitive surface portion of the resonant member that faces and is capacitively coupled to a capacitive surface portion of the electrode.

In another example of the third aspect, the proximal end portion of the projection is connected to a portion of the main body that displaces in a direction substantially parallel to the node axis in the second mode.

In yet another example of the third aspect, displacement for each point along the capacitive surface portion of the resonant member is substantially tangent to the point in the first mode. In one example, the capacitive surface portion of the resonant member is curved.

It is to be understood that both the foregoing general description and the following detailed description present example and explanatory embodiments. The accompanying drawings are included to provide a further understanding of the described embodiments and are incorporated into and constitute a part of this specification. The drawings illustrate various example embodiments.

BRIEF DESCRIPTION OF DRAWINGS

The foregoing and other aspects of the present invention will become apparent to those skilled in the art to which the present invention relates upon reading the following description with reference to the accompanying drawings, in which.

DESCRIPTION OF EMBODIMENTS

Figure 1:
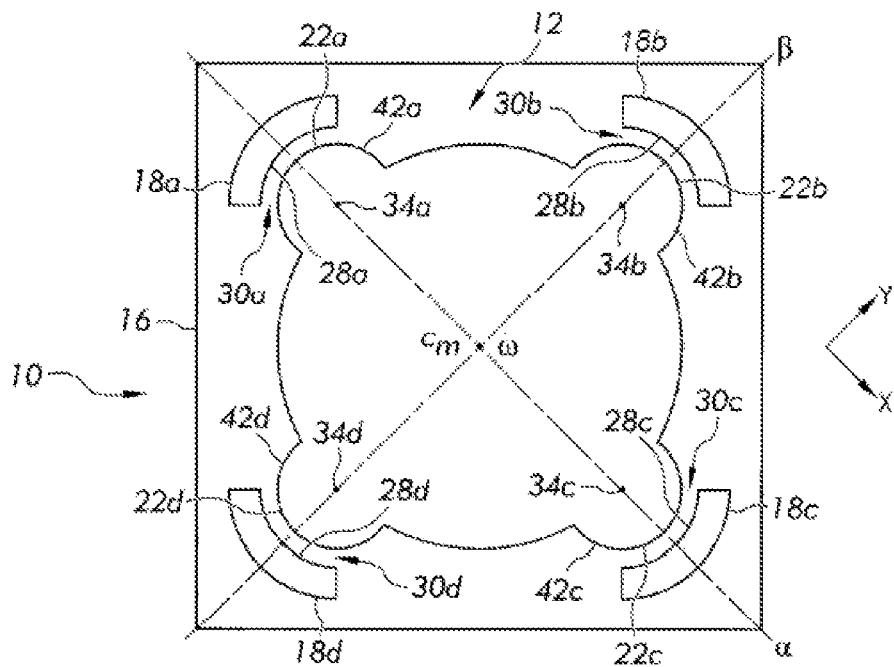
FIG. 1 is a schematic plan view of an example sensing device according to a first embodiment.

Example embodiments are described and illustrated in the drawings. These illustrated examples are not intended to be a limitation on the present invention. For example, one or more aspects can be utilized in other embodiments and even other types of devices. Moreover, certain terminology is used herein for convenience only and is not to be taken as a limitation.

Turning to FIG. 1, a first embodiment of a sensing device 10 will now be described. The sensing device 10 in the present example corresponds to a MEMS gyroscope. However, the sensing device 10 can correspond to other sensing devices in other examples such as a MEM accelerometer.

The sensing device 10 in FIG. 1 includes a resonant member 12 that is supported relative to a substrate 16, and a plurality of electrodes 18 that are spaced from the resonant member 12. Each electrode 18 is capacitively coupled to the resonant member 12. More specifically, the resonant member 12 has a plurality of capacitive surface portions 22 that each face and is capacitively coupled to an associated capacitive surface portion 28 of an electrode 18. A capacitive channel 30 is thereby defined between the resonant member 12 and each electrode 18.

Example support structure for supporting the resonant member 12 relative to the substrate 16 will be described below in further detail. In general, the resonant member 12 is flexibly supported relative to the substrate 16 such that the resonant member 12 is movable in two resonant modes—a drive mode and a sense mode. In the present embodiment, two of the electrodes 18a, 18c are drive electrodes that are operable to apply a driving force to the resonant member 12 in an X direction so as to excite the resonant member 12 and vibrate the resonant member 12 in the drive mode at a given frequency (e.g., a natural frequency of the resonant member 12). If the resonant member 12 is rotated, the Coriolis Effect will transfer energy from the drive mode to the sense mode and cause the resonant member 12 to vibrate in the sense mode. Moreover, two of the electrodes 18b, 18d are sense electrodes that are configured to generate a current in response to sense-mode movement of the resonant member 12 in a Y direction that is perpendicular to the X direction. This current can thus be analyzed to determine the rotation rate of the resonant member 12.

The shapes of the resonant member 12 and electrodes 18 can vary by embodiment, as well as the number and arrangement of the electrodes 18 relative to the resonant member 12. In general, the resonant member 12 can be a planar body that extends along the X-Y plane and has a central axis ω that passes through a centroid (i.e., center of mass) cm of the resonant member 12 and is normal to the X-Y plane. Additionally, each electrode 18 is preferably aligned with a node axis of the resonant member 12.

For example, the drive electrodes 18a, 18c in the present embodiment are aligned with a first node axis α that passes through two node points 34a, 34c of the resonant member 12, and the sense electrodes 18b, 18d are aligned with a second node axis β that passes through two other node points 34b, 34d of the resonant member 12. The two node points 34a, 34c correspond to nodes of the resonant member 112 in sense mode and antinodes of the resonant member 112 in drive mode, while the other two node points 34b, 34d correspond to antinodes of the resonant member 112 in sense mode and nodes of the resonant member 112 in drive mode. The first and second node axes α, β are substantially parallel to the X direction and Y direction, respectively, and intersect each other at the central axis m of the resonant member 12. Moreover, the capacitive surface portions 22, 28 of the resonant member 12 and electrodes 18 are preferably shaped and arranged such that their capacitive channels 30 are symmetrical about their associated node axes α, β.

In some examples, one or more of the resonant member's capacitive surface portions 22 can be configured such that displacement for each point along the capacitive surface portion 22 in a particular resonant mode of the resonant member 12 (e.g., drive mode or sense mode) is substantially tangent to the point (for the purposes of this disclosure, "substantially tangent" or "substantially tangential" means 10 degrees or less from tangent and preferably, 5 degrees or less from tangent and more preferably, 2 degrees or less from tangent). For example, in the present embodiment, capacitive surface portions 22a, 22c associated with the drive electrodes 18a, 18c are each configured such that displacement for each point along the capacitive surface portion 22 is substantially tangent to the point in sense mode. Meanwhile, capacitive surface portions 22b, 22d associated with the sense electrodes 18b, 18d are each configured such that displacement for each point along the capacitive surface portion 22 is substantially tangent to the point in drive mode.

To enable such displacement of the capacitive surface portions 22, the resonant member 12 in the present embodiment includes a main body 40 and a plurality of projections 42 that are integrally connected to and project radially outward from the main body 40 along the X-Y plane (for the purposes of this disclosure, a radial direction is a direction that is perpendicular to and intersects with the central axis ω of the resonant member 12). Two of the projections 42a, 42c are aligned with the first node axis α and have convex surfaces that respectively define the capacitive surface portions 22a, 22c of the resonant member 12, while the other two projections 42b, 42d are aligned with the second node axis β and have convex surfaces that respectively define the capacitive surface portions 22b. 22d. Each capacitive surface portion 22 is located in proximity to an associated node point 34 of the resonant member 12. The curvature and proximity of each capacitive surface portions 22 to its associated node point 34 can enable displacement for each point along the capacitive surface portion 22 to be substantially tangent to the point in sense mode for capacitive surface portions 22a, 22c and drive mode for capacitive surface portions 22b, 22d.

When drive-mode displacement of the resonant member's capacitive surface portions 22b, 22d is substantially tangent along the surfaces, the drive-mode distance between the capacitive surface portions 22b, 22d and their associated capacitive surface portions 28b, 28d of the electrodes 18b, 18d in the Y direction will remain substantially constant. Accordingly, the resulting drive-mode current generated at the electrodes 18b, 18d will be substantially zero, even if the capacitive channels 30b, 30d are asymmetrical due to imperfections in the capacitive surface portions 28b, 28d of the electrodes 18b, 18d. Thus, the ZRO effect described above can be prevented.

Moreover, when sense-mode displacement of the resonant member's capacitive surface portions 22a, 22c is substantially tangent along their surfaces, this will prevent the drive electrodes 18a, 18c from exciting sense mode in a manner that also leads to the ZRO effect, even if the capacitive channels 30a, 30b are asymmetrical due to imperfections in the capacitive surface portions 28a, 28c of the electrodes 18a, 18c.

It is to be appreciated that the resonant member 12 can comprise a variety of other configurations that can produce tangential displacement of its capacitive surface portions 22 to prevent the ZRO effect. Indeed, displacement of a surface point along a resonant member 12 will depend on, for example, the location of the point (e.g., relative to a node point) and the resonant member's size, shape, mass, and material properties, which can all vary by embodiment. Accordingly, the configuration of a resonant member 12 and its capacitive surface portions 22 can vary greatly by embodiments to produce tangential displacement of capacitive surface portions 22.

For instance, described below are other embodiments of the sensing device 10 with different configurations than can produce similar and/or alternative effects. For the following embodiments, the same reference numerals are used to indicate similar or like components. As appropriate, aspects in each embodiment that are different from the other embodiments will be described or otherwise apparent, while the description of aspects that are the same will be omitted.

Figure 2:
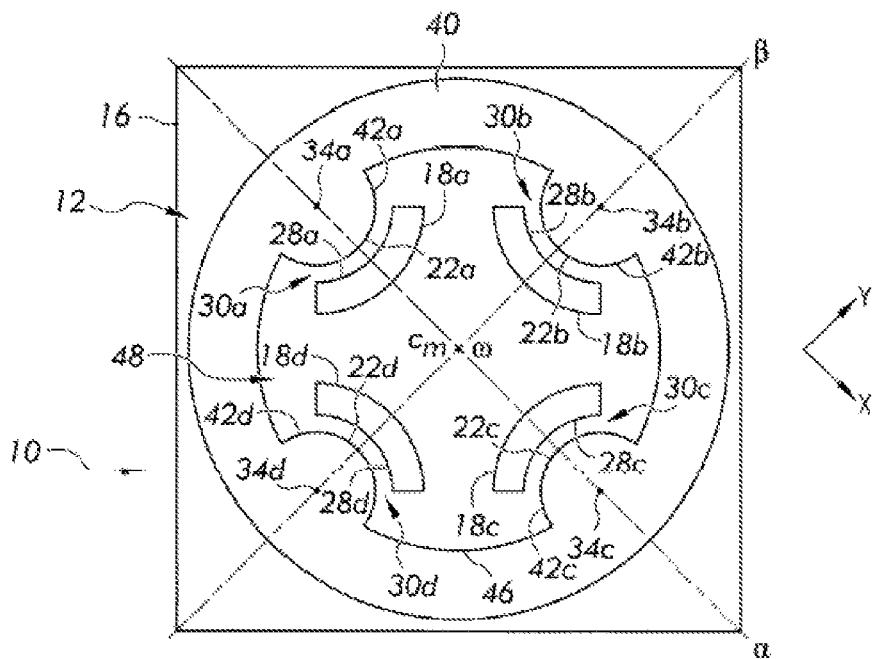
FIG. 2 is a schematic plan view of the sensing device according to a second embodiment.

FIG. 2 shows a second embodiment wherein the main body 40 of the resonant member 12 is an annular body having an inner perimeter 46 that defines an opening 48 that extends through the main body 40. In this embodiment, the projections 42 of the resonant member 12 project radially inward from the inner perimeter 46 of the main body 40 along the node axes α, β toward its central axis ω. The projections 42 similarly have convex surfaces that define the capacitive surface portions 22 of the resonant member 12. Moreover, the electrodes 18 are arranged within the opening 48 such that their capacitive surface portions 28 face their associated capacitive surface portions 22 of the resonant member 12.

Figure 3:
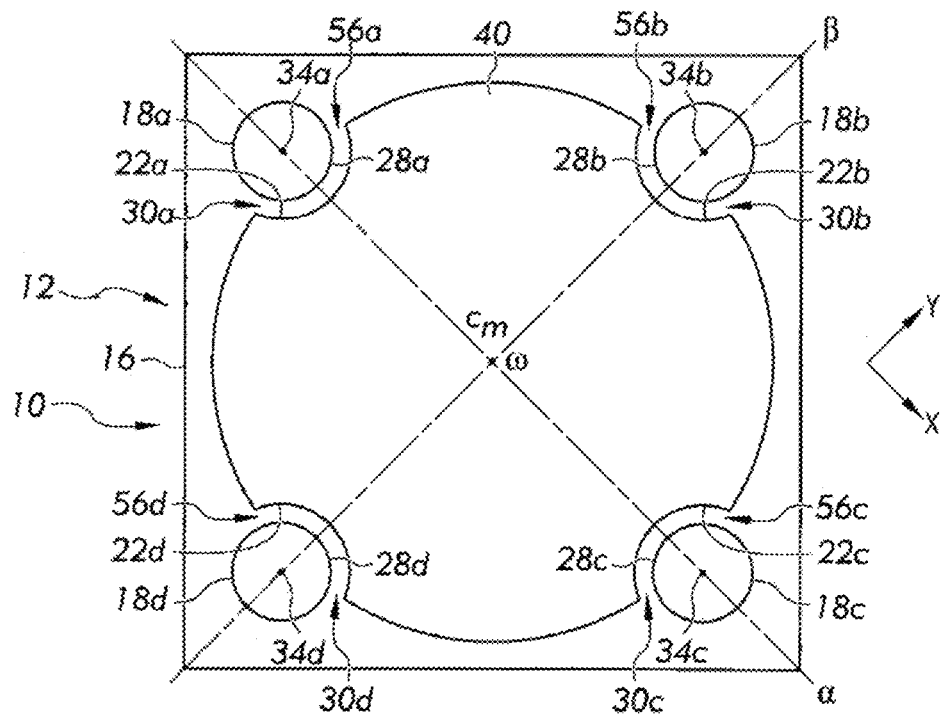
FIG. 3 is a schematic plan view of the sensing device according to a third embodiment.

FIG. 3 shows a third embodiment wherein the capacitive surface portions 22 of the resonant member 12 correspond to recessed surface portions of the main body 40 that define associated recesses 56 extending radially into the main body 40 along the X-Y plane and toward its central axis ω. Two of the recesses 56a, 56c can be aligned with the first node axis α, while the other two recesses 56b, 56d can be aligned with the second node axis α. In this example, the capacitive surface portions 22 are concave surfaces.

Figure 4:
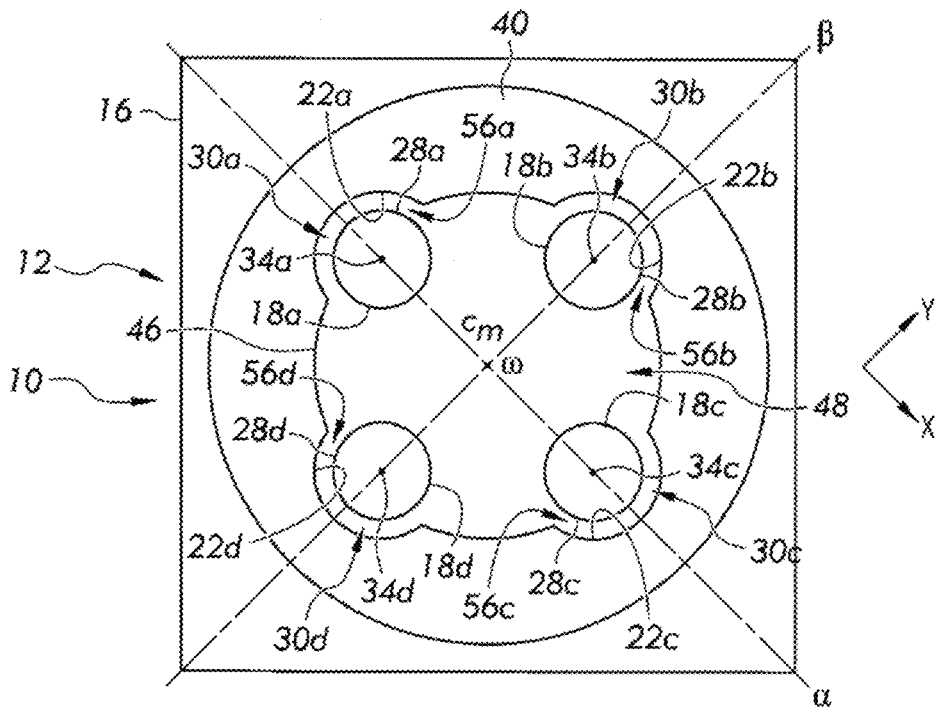
FIG. 4 is a schematic plan view of the sensing device according to a fourth embodiment.

FIG. 4 shows a fourth embodiment wherein the main body 40 of the resonant member 12 again is an annular body. In this embodiment, the recesses 56 of the resonant member 12 are located along its inner perimeter 46 and project radially into the main body 40 along the node axes α, β away from the central axis c. The capacitive surface portions 22 similarly are concave surfaces that define the recesses 56 of the resonant member 12. Moreover, the electrodes 18 are arranged within the opening 48 such that their capacitive surface portions 28 face their associated capacitive surface portions 22 of the resonant member 12.

In each of the embodiments in FIGS. 2-4, the capacitive surface portions 22 of the resonant member 12 are curved and arranged in proximity to an associated node point 34. Similar to the first embodiment, the curvature and proximity of the capacitive surface portions 22 to their associated node points 34 in the second, third, and fourth embodiments can enable displacement for each point along the capacitive surface portions 22 to be substantially tangent to the point in sense mode for capacitive surface portions 22a. 22c and drive mode for capacitive surface portions 22b, 22d. Accordingly, the second, third, and fourth embodiments can similarly prevent the ZRO effect described above.

Figure 5:
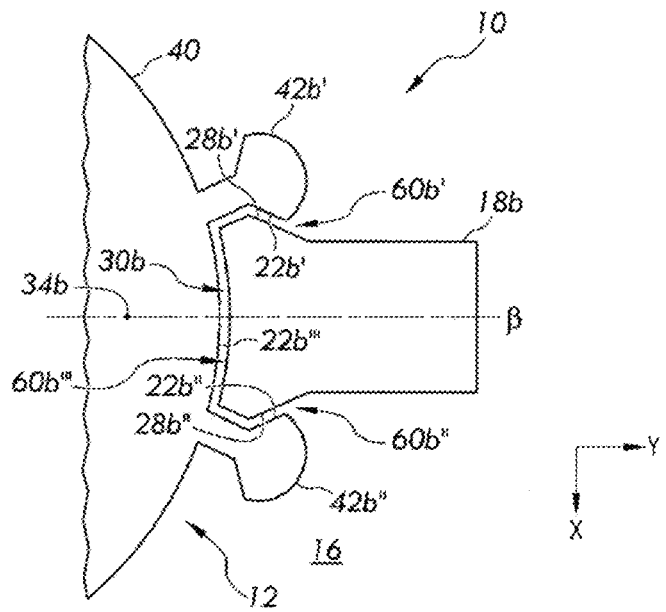
FIG. 5 is an enlarged, schematic plan view of the sensing device according to a fifth embodiment.

FIG. 5 is an enlarged view of a fifth embodiment wherein the resonant member 12 has two projections 42b', 42b" that extend radially outward from its main body 40 and are located on opposite sides of the sense electrode 18b such that the capacitive channel 30b between the resonant member 12 and sense electrode 18b wraps around the electrode 18b. The surfaces of the resonant member 12 and electrode 18b along the channel 30b are capacitively coupled to each other. In particular, the two projections 42b', 42b" respectively define two capacitive surface portions 22b', 22b" of the resonant member 12 that face and are capacitively coupled to two capacitive surface portions 28b', 28b" of the electrode 18b. These two capacitive surface portions 22b', 22b" of the resonant member 12 respectively define two end portions 60b', 60b" of the capacitive channel 30b. Meanwhile, the resonant member 12 has a capacitive surface portion 22b''' that defines a mid-portion 60b''' of the capacitive channel 30b.

The capacitive surface portions 22b', 22b" in the fifth embodiment are illustrated as planar but in reality will have a slight curvature that follows a two to five polynomial curve. Nonetheless, the capacitive surface portions 22b', 22b" are similarly configured such that displacement for each point along the capacitive surface portions 22b', 22b" is substantially tangent to the point in drive mode.

As noted above, the DRIE process that is commonly used to form capacitive channels in a sensor device can form imperfections in the capacitive surface portions at the ends of the channel. In the present embodiment, the capacitive surface portions 22b', 22b" at the end portions end portions 60b', 60b" of the capacitive channel 30b are configured such that displacement for each point along the capacitive surface portions 22b', 22b" is substantially tangent to the point in drive mode. Thus, even if imperfections arise at the end portions 60*b*', 60*b*" of the capacitive channel 30*b*, the substantially tangent movement can prevent the ZRO effect described above.

Moreover, because imperfections are unlikely to occur at the mid-portion 60*b*''' of the capacitive channel 30*b*, the mid-portion 60*b*''' is likely to stay symmetrical about the second node axis β. Thus, even if movement of the capacitive surface portion 22*b*''' is non-tangential during drive mode, the total capacitive displacement of the capacitive surface portion 22*b*''' would be zero, thereby resulting in a zero current at the sense electrode 18*b*.

It is to be appreciated that resonant member 12 can include similar projections 42 at the other electrodes 18 of the sensing device 10. For projections 42 at the drive electrodes 18*a*, 18*d*, the corresponding capacitive surface portions at the end portions of their capacitive channels would exhibit substantially tangent displacement in sense mode rather than drive mode. Moreover, similar relationships and effects can be achieved with embodiments wherein the resonant member 12 is annular and the electrodes 18 are arranged within the central opening of the resonant member 12 with projections 42 extending radially inward from the main body on opposite sides of each electrode 18. Still further, the projections 42 may have alternative shapes than those illustrated with the fifth embodiment. For instance, in some embodiments, the projections 42 may be substantially rectangular or square.

Figure 6:
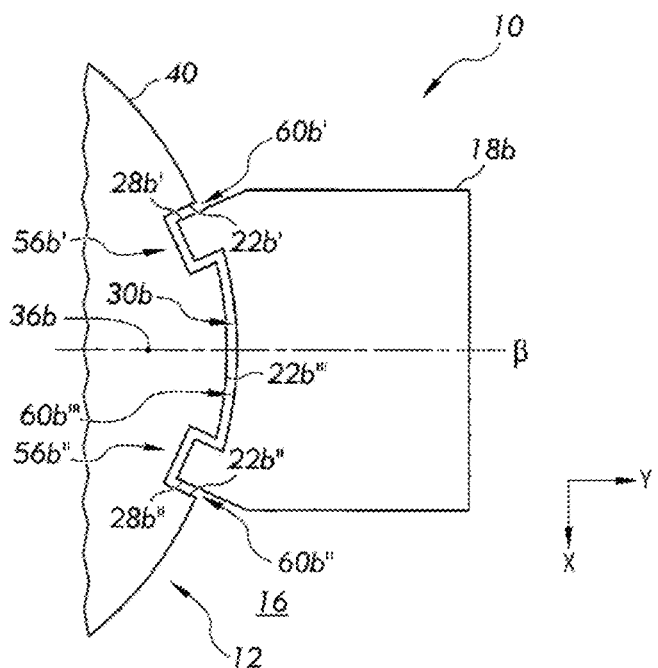
FIG. 6 is an enlarged, schematic plan view of the sensing device according to a sixth embodiment.

FIG. 6 is an enlarged view of a sixth embodiment wherein the resonant member 12 has two recess 56*b*', 56*b*" that extend radially into the main body 40 and the sense electrode 18*b* has two projections 62*b*', 62*b*" arranged in the recesses 56*b*', 56*b*" such that the capacitive channel 30*b* between the resonant member 12 and sense electrode 18*b* wraps around the electrode 18*b*. The Similar to the fifth embodiment, the resonant member 12 has two capacitive surface portions 22*b*', 22*b*" that face and are capacitively coupled to two capacitive surface portions 28*b*', 28*b*" of the electrode 18*b*. Moreover, these two capacitive surface portions 22*b*', 22*b*" of the resonant member 12 respectively define two end portions 60*b*', 60*b*" of the capacitive channel 30*b*. The capacitive surface portions 22*b*', 22*b*" in the sixth embodiment correspond to recessed surface portions of the main body 40 that respectively define the two recesses 56*b*', 56*b*", and are similarly configured such that displacement for each point along the capacitive surface portions 22*b*', 22*b*" is substantially tangent to the point in drive mode. Thus, even if imperfections arise at the end portions 60*b*', 60*b*" of the capacitive channel 30*b*, the substantially tangent movement at the capacitive surface portions 22*b*', 22*b*" can prevent the ZRO effect described above. Moreover, because imperfections are unlikely to occur at the mid-portion 60*b*''' of the capacitive channel 30*b*, the mid-portion 60*b*''' is likely to stay symmetrical about the second node axis β. Thus, even if movement of a capacitive surface portion 22*b*''' of the resonant member 12 at the mid-portion 60*b*''' is non-tangential during drive mode, the total capacitive displacement of the capacitive surface portion 22*b*''' would be zero, thereby resulting in a zero current at the sense electrode 18*b*.

It is to be appreciated that resonant member 12 can include similar recesses 56 for the other electrodes 18 of the sensing device 10. For recesses 56 at the drive electrodes 18*a*, 18*c*, the corresponding capacitive surface portions at the end portions of their capacitive channels would exhibit substantially tangent displacement in sense mode rather than drive mode. Moreover, similar relationships and effects can be achieved with embodiments wherein the resonant member 12 is annular and the electrodes 18 are arranged within recesses 56 located along the inner perimeter of the main body. Still further, the recesses 56 may have alternative shapes than those illustrated with the sixth embodiment.

Generally speaking, the effects of the fifth and sixth embodiments can be similarly realized in any configuration in which the resonant member 12 and an electrode 18 define a capacitive channel 30 that wraps around the electrode 18 such that the electrode 18 is arranged between two capacitive surface portions 22 of the resonant member 12 that define end portions of the capacitive channel 30 and displace in a substantially tangent direction in sense mode for a drive electrode or drive mode for a sense electrode.

Figure 7:
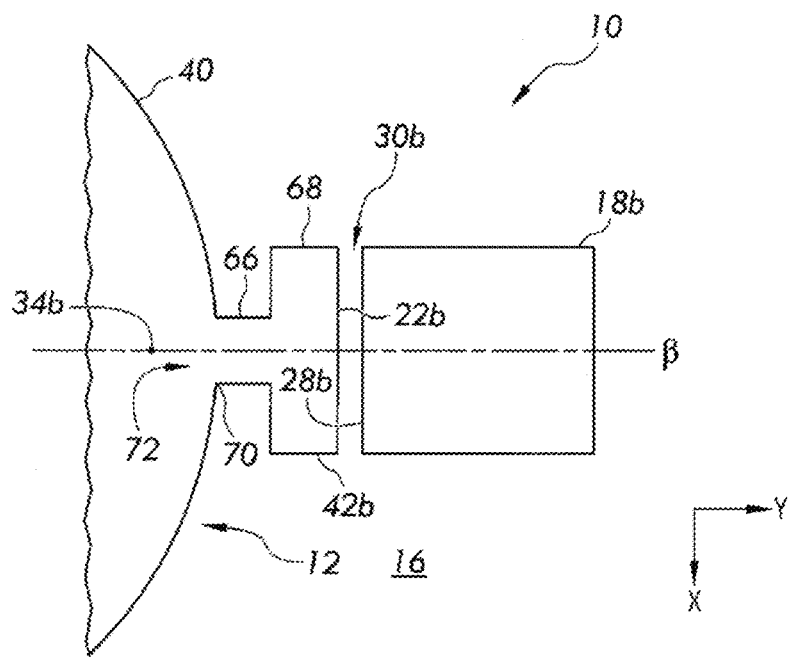
FIG. 7 is an enlarged, schematic plan view of the sensing device according to a seventh embodiment.

FIG. 7 is an enlarged view of a seventh embodiment wherein the resonant member 12 has a projection 42*b* that extends radially outward from its main body 40 along the second node axis β. The projection 42*b* has a proximal end portion 66 that is located nearest to the main body 40 and a distal end portion 68 that is located farthest from the main body 40. The distal end portion 68 defines a capacitive surface portion 22*b* of the resonant member 12 that faces and is capacitively coupled to the capacitive surface portion 28*b* of the electrode 18*b*. In this example, the capacitive surface portion 22*b* of the resonant member 12 is substantially planar.

The distal end portion 68 is wider than the proximal end portion 66 (their widths being measured along the X-Y plane in a direction perpendicular to the second node axis β). In particular, the capacitive surface portion 22*b* of the distal end portion 68 is wider than a base 70 of the proximal end portion 66 that connects to a portion 72 of the main body 40. Consequently, sense mode displacement at the portion 72 of the main body 40 (which is substantially parallel to the second node axis β) will transfer to the capacitive surface portion 22*b*, which provides a greater surface area for capacitive coupling to the electrode 18*b* and will effectively amplify the sense mode current produced at the electrode 18*b*. For the purposes of this disclosure. "substantially parallel" means 10 degrees or less from parallel and preferably, 5 degrees or less from parallel and more preferably, 2 degrees or less from parallel.

Figure 8:
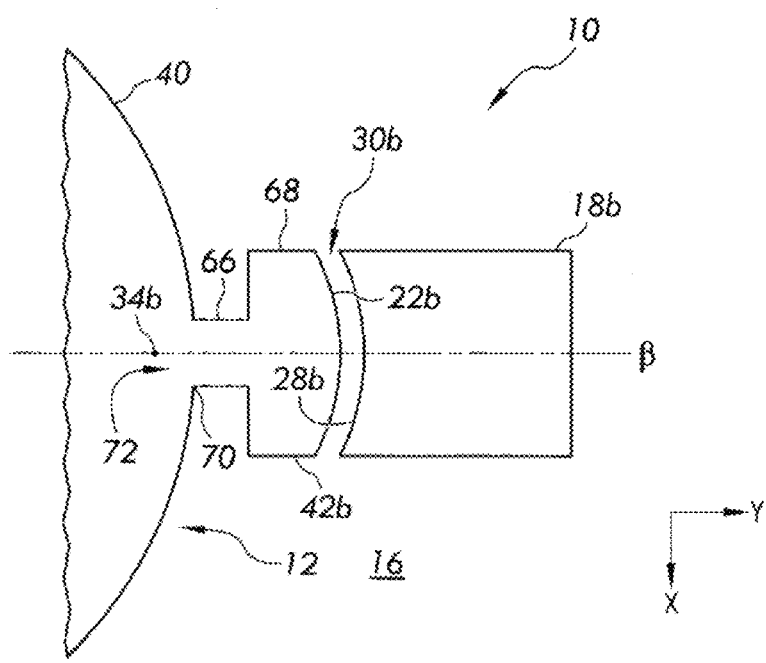
FIG. 8 is an enlarged, schematic plan view of the sensing device according to an eighth embodiment.

It is to be appreciated that the resonant member 12 can include similar projections 42 at the other electrodes 18 of the sensing device 10. For projections 42 at the drive electrodes 18*a*, 18*c*, the corresponding capacitive surface portions at the distal end portions 68 will effectively amplify the drive-mode excitement that is produced in the resonant member 12 by the drive electrodes 18*a*, 18*c*. Moreover, similar relationships and effects can be achieved with embodiments wherein the resonant member 12 is annular and the electrodes 18 are arranged within the central opening of the resonant member 12 with projections 42 extending radially inward from the main body 40 on opposite sides of each electrode 18. Still further, the projections 42 may have alternative shapes than those illustrated with the seventh embodiment. For instance, in some embodiments, the proximal end portion 66 and/or distal end portion 68 of the projections 42 can be tapered such that their widths increase along their associated node axis in the radial outward direction. FIG. 8 shows an eighth embodiment that is a variation of the seventh embodiment wherein the capacitive surface portion 22*b* of the distal end portion 68 is a curved surface. In particular, the capacitive surface portion 22*b* is convex and arranged such that each point along the capacitive surface portion 22*b* is located in proximity to its associated node point 34*b*. Similar to the first embodiment, the curvature and proximity of the capacitive surface portion 22*b* to its associated node point 34*b* can enable displacement for each point along the capacitive surface portion 22*b* to be substantially tangent to the point in sense mode. Accordingly, the capacitive surface portion 22*b* can similarly prevent the ZRO effect described above.

It is to be appreciated that the projection 42 of the eighth embodiment can be applied at the other electrodes 18 of the sensing device 10. For projections 42 at the drive electrodes 18*a*, 18*d*, the corresponding capacitive surface portions at their distal end portions would exhibit substantially tangent displacement in sense mode rather than drive mode. Moreover, similar relationships and effects can be achieved with embodiments wherein the resonant member 12 is annular and the electrodes 18 are arranged within the central opening of the resonant member 12 with projections 42 extending radially inward from the main body on opposite sides of each electrode 18. Still further, the capacitive surface portions at the distal end portions of the projections 42 may have other curvatures such as, for example, a concave curvature.

Figure 9:
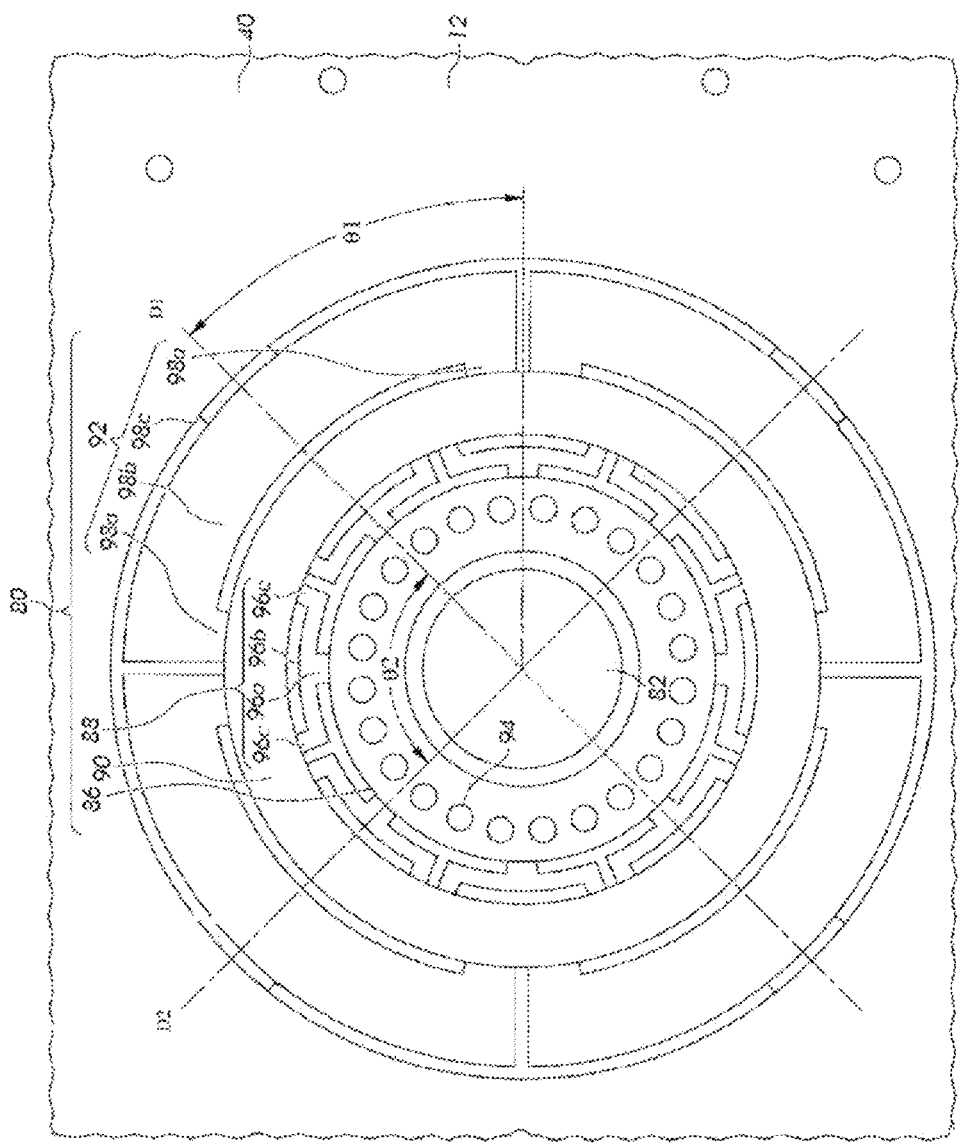
FIG. 9 is a schematic plan view of an example decoupling mechanism of the sensing device.

As noted above with reference to FIG. 1, the resonant member 12 is flexibly supported relative to the substrate 16 such that the resonant member 12 is movable in two resonant modes—the drive mode and sense mode. U.S. Patent Application Publication No. 2016/0327390, which is incorporated herein by reference in its entirety, discloses various example structures (referred to as "decoupling mechanisms") for flexibly supporting a resonant member relative to a substrate that can be applied to the sensing device 10 of the present disclosure. These structures are referred to as "decoupling mechanisms" because they attach the resonant member to a support structure (e.g., anchor) such that the resonant member is flexibly decoupled from the fixed support structure and can vibrate with little or no influence from the fixed support structure. One specific example of a decoupling mechanism 80 is illustrated in FIG. 9 of the present disclosure, which shows an enlarged view of an embodiment wherein the main body 40 of the resonant member 12 is annular and supported by an anchor 82. The anchor 82 is fixed to a substrate that is located below the main body 40 and anchor 82 and therefore is not visible in FIG. 9. The decoupling mechanism 80 attaches the resonant member 12 to the anchor 82 such that the resonant member 12 is flexibly decoupled from the anchor 82 and can vibrate with little or no influence from the anchor 82.

As shown in FIG. 9, the decoupling mechanism 80 has a flange 86, a plurality of first elastic portions 88, a ring portion 90, and a plurality of second elastic portions 92. The flange 86 is ring shaped and surrounds the anchor 82. The flange 86 is directly connected to the anchor 80 and has holes 94 aligned in a circular direction to reduce its stiffness. The ring portion 90 surrounds the flange 86 and is located between the main body 40 and the flange 86.

The first elastic portions 88 connect the flange 86 to the ring portion 90, and each have a first connecting portion 96*a*, a body portion 96*b* extending in the circumferential direction, and two second connecting portion 96*c*. For each first elastic portion 88, the first connecting portion 96*a* connects the flange 86 to a center of the body portion 96*b*, while the second connecting portions 96*c* connect ends of the body portion 96*b* to the ring portion 90. The first connecting portions 96*a* of the first elastic portions 88 are arranged about the center of the anchor 64 (which coincides with the central axis ω of the resonant member 12) at every angle θ1, wherein the angle θ1 is about 45 degrees.

The second elastic portions 92 connect the ring portion 90 to the main body 40, and each have two third connecting portions 98*a*, a body portion 98*b* extending in the circumferential direction, and a fourth connection portion 98*c*. For each second elastic portion 92, the third connecting portions 98*a* connect the ring portion 90 to ends of the body portion 98*b*, while the fourth connecting portion 98*c* connects a center of the body portion 98*b* to the main body 40. The fourth connecting portion 98*c* of the second elastic portions 92 are arranged about the center of the anchor 64 at every angle θ2, wherein the angle θ2 is about 90 degrees. Moreover, the fourth connecting portions 98*c* of the second elastic portions 92 are radially aligned with first connecting portions 96*a* of the first elastic portions 88, and preferably are connected to portions of the main body 40 that have substantially the same stiffness.

An overall size of each first elastic portions 88 is smaller than that of each second elastic portion 92, and the number of first elastic portions 88 is higher than that of the second elastic portions 92. In particular, the decoupling mechanism 80 includes eight first elastic portions 88 and four second elastic portions 92. Moreover, the first elastic portions 88, ring portion 90, and second elastic portions 92 are made from single-crystal silicon.

Total energy loss from the resonant member 12 during vibration can be expressed as shown in following equation:

$$\frac{1}{Q_{TOTAL}} = \frac{1}{Q_{viscous}} + \frac{1}{Q_{TED}} + \frac{1}{Q_{surface}} + \frac{1}{Q_{material}} + \frac{1}{Q_{anchor}} \quad [\text{Math. 1}]$$

$Q_{anchor}$ corresponds to energy loss from the resonant member 12 to the anchor 82. This energy loss can get coupled into another mode, leading to the ZRO effect. For example, some energy can flow from the drive mode to the sense mode and cause the ZRO effect. $Q_{TED}$ corresponds to energy loss from the resonant member 12 due to interaction of mechanical resonances with thermal modes of the sensing device 10. The mechanical and thermal domains are coupled to each other through the coefficient of thermal expansion (CTE) leading to thermoelastic damping (TED).

If the decoupling mechanism 80 has lower stiffness, energy becomes difficult to transmit from its elastic portions 88, 92, and $Q_{anchor}$ energy loss can be reduced. In this embodiment, the stiffness of each first elastic portion 88 is lower than that of each second elastic portion 92. The stiffness of each first elastic portion 88 can be lowered by reducing its size. For example, a thickness of each first elastic portion 88 and/or a circumferential width of the first connection portion 96*a*, the body portion 96*b*, and/or the second connection portions 96*c* can be reduced. In addition or alternatively, the stiffness of each first elastic portion 88 can be lowered by utilizing a material with a low modulus of elasticity. Although the stiffness of each first elastic portion 88 is low, the total stiffness of the first elastic portions 88 is high due to their large number. Accordingly, $Q_{anchor}$ energy loss can be reduced (due to the low stiffness of each first elastic portion 88) while ensuring that the sensing device 10 is not prone to out-of-plane shock and vibration (due to the total stiffness of the first elastic portions 88).

Furthermore, $Q_{anchor}$ energy loss can be reduced by locating the fourth connecting portions 98*c* of the second elastic portions 92 along a first direction of the resonant member's crystalline orientation and a second direction perpendicular to the crystalline orientation. For example, in the present embodiment, the number of the fourth connecting portions 98*c* is four. Two of the fourth connecting portions 98*c* are located along a first axis D1 that corresponds to the [110]

crystalline orientation direction of the resonant member 12, while the other two connecting portions 98c are located on a second axis D2 that is perpendicular to the first axis D1. $Q_{anchor}$ energy loss can be reduced by lowering the stiffness of the flange 86 with holes 94.

Having a wider connecting point and stiffer elastic portion to the resonant member 12 can improve $Q_{TED}$ as it reduces strain variation on that region during vibration. In the present embodiment, the stiffness of each second elastic portion 92 is higher than that of each first elastic portion 92. Accordingly, the $Q_{TED}$ improves.

The ring portion 90 acts as buffer. It combines displacements coming from different connection points at the resonant member 12 and cancels them with each other reducing the overall displacement at the ring portion 90 and reduces any energy transfer to the anchor 82. Because the first elastic portions 88 and second elastic portions 92 are connected via the ring portion 90, an interference of the first elastic portions 88 and the second elastic portions 92 on each other can be reduced. Therefore, the benefit of improving anchor loss at the first elastic portions 88 and the benefit of improving $Q_{TED}$ at the second elastic portion 92 can be obtained independently. Hence, the decoupling mechanism 80 can improve both of anchor loss and $Q_{TED}$.

The first elastic portions 88 in the present embodiment each have lower stiffness that that of each second elastic portion 92. Accordingly, it is relatively easy to design the decoupling mechanism 80 so that the flange 86 and the first elastic portions 88 have the benefit of improving anchor loss on the inner side of the ring portion 90, while the outer side of the ring portion 90 has the independent benefit of improving $Q_{TED}$. It is to be appreciated that the first elastic portion 88 may have higher stiffness and the second elastic portion 92 may have lower stiffness in some examples. However, if the decoupling mechanism 80 is designed with high stiffness for the first elastic portions 88 and low stiffness for the flange 86 by the holes 94, it can be difficult to achieve such independent benefits for the inside and outside of the ring portion 90.

The decoupling mechanism 80 in FIG. 9 can be applied to any of the embodiments described above that have electrodes 18 arranged outside an outer perimeter of their resonant member 12. Moreover, it is to be appreciated that the decoupling mechanism 80 can comprise a variety of other configurations. For example, the fourth connecting portions 98c can be aligned along other crystalline orientations of the resonant member 12 such as the [100] orientation. As another example, the decoupling mechanism can include eight total fourth connecting portions 98c. In such examples, some fourth connecting portions 98c can be aligned along the [110] orientation of the resonant member 12 while others are aligned along the [100] orientation. As the number of the fourth connecting portions 98c increases, so does influence of thermoelastic damping, thereby providing a lower $Q_{TED}$. Other example configurations for the decoupling mechanism 80 are disclosed in the '390 publication.

Figure 10:
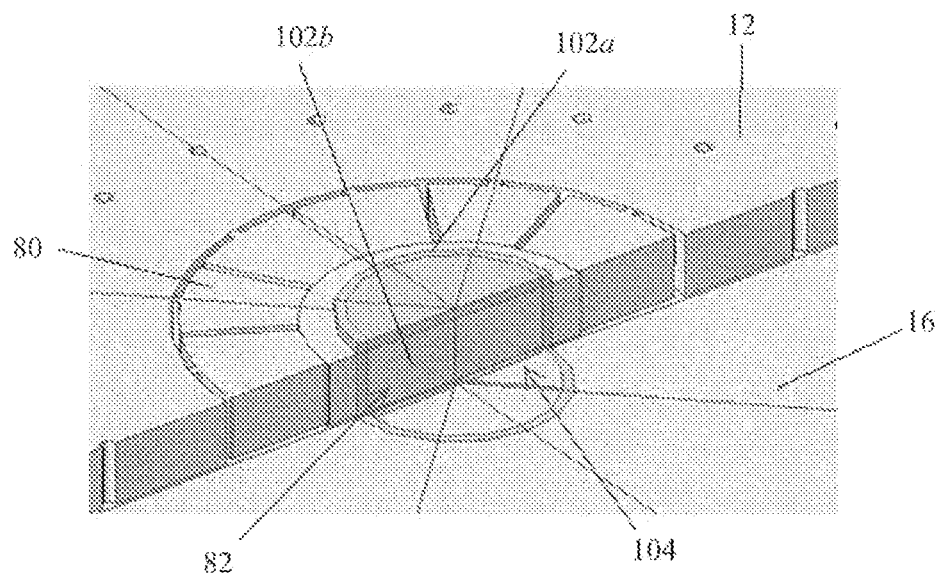
FIG. 10 is a perspective, partial cross-sectional schematic view of an anchor for the sensing device.

FIG. 10 shows an example configuration for the anchor 82 wherein the anchor 82 has a first region 102a made from polysilicon and a second region 102b made from single crystal silicon that is surrounded by the first region 102a. The first region 102a connects the anchor 82 to the decoupling mechanism 80 and can provide electrical connection between the sensing device 10 and the substrate 16. Meanwhile, a void 104 is formed underneath the second region 102b so that its entire bottom surface is spaced from the substrate 16. During the manufacturing of the anchor 82, the second region 102b is connected to the substrate 16 via silicon dioxide and the void 104 is created by later removing the silicon dioxide. By connecting the anchor 82 and the substrate 16 via only the first region 102a, the stiffness of the anchor 82 is reduced and has the benefit of the improving anchor loss.

Figure 11:
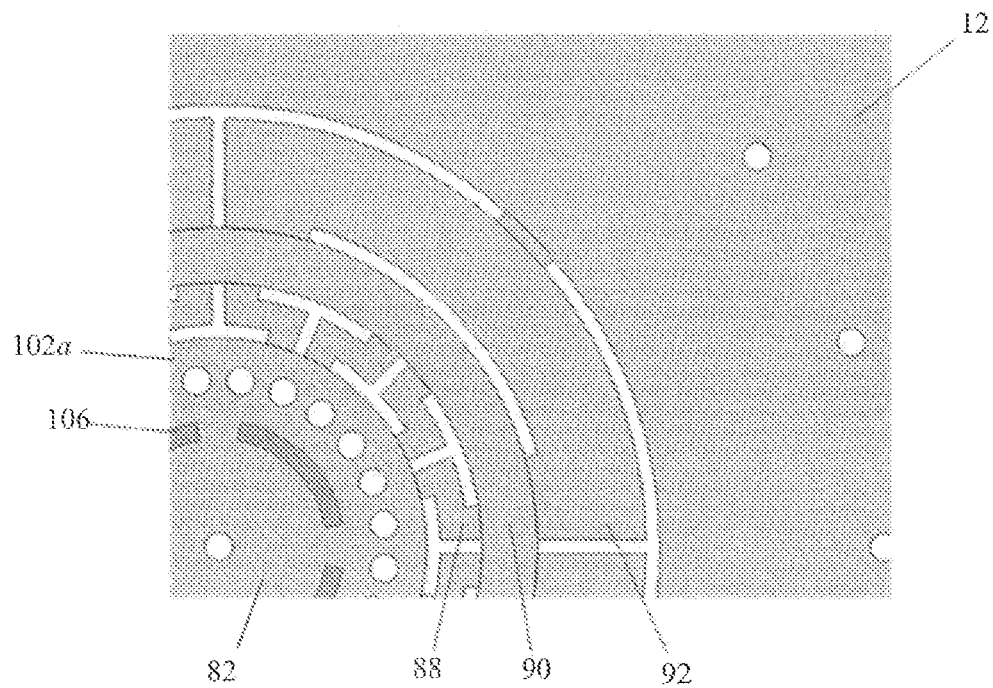
FIG. 11 is an enlarged, schematic plan view of the sensing device wherein slits are formed in the anchor.
Figure 12:
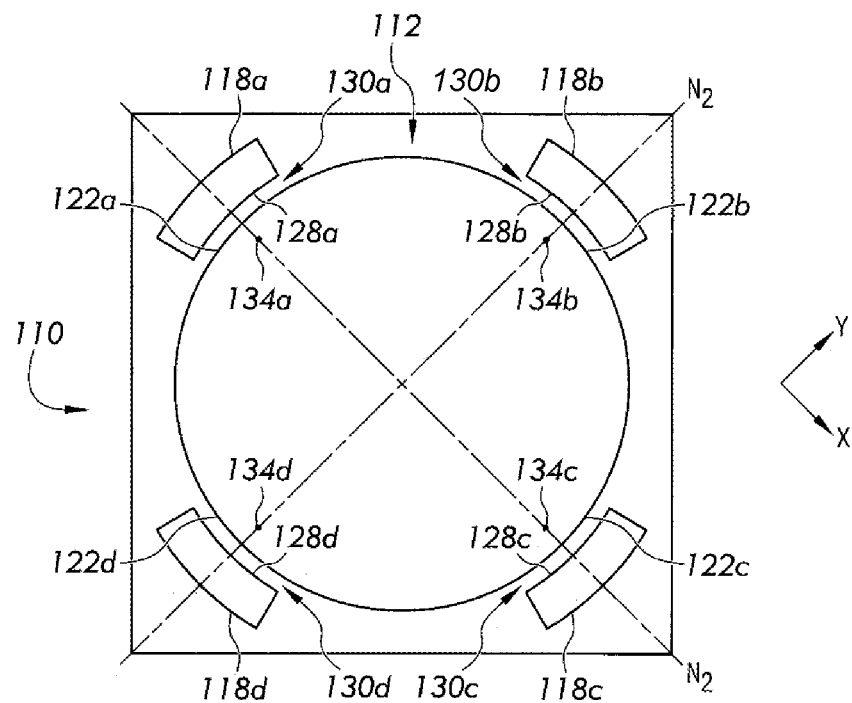
FIG. 12 is a schematic plan view of an example sensing device in the prior art.
Figure 13:
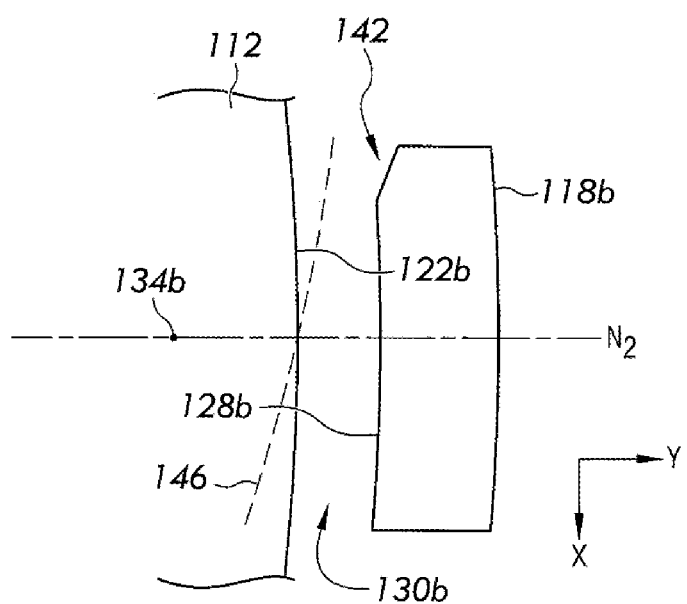
FIG. 13 is an enlarged view of the sensing device in FIG. 12.

Typically, a smaller anchor 82 would provide a smaller path for energy loss and therefore can help the design. However, reducing the radius of the anchor 82 can make the sensing device 10 more prone to out-of-plane shock and vibration. FIG. 11 shows an embodiment for the anchor 82 wherein slits 106 are formed in the first region 102a to reduce the size of the anchor 82 without reducing its radius. Accordingly, energy loss at the anchor 82 is reduced.

This application has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

The invention claimed is:

1. A sensing device comprising:
a resonant member that is movable in a first mode and a second mode; and
an electrode,
wherein the resonant member has a capacitive surface portion that faces and is capacitively coupled to a capacitive surface portion of the electrode,
wherein displacement for each point along the capacitive surface portion of the resonant member in the first mode is substantially tangent to the point.

2. The sensing device of claim 1, wherein the capacitive surface portion of the resonant member is curved.

3. The sensing device of claim 1, wherein the capacitive surface portion of the resonant member is concave.

4. The sensing device of claim 1, wherein the capacitive surface portion of the resonant member is convex.

5. The sensing device of claim 1, wherein:
the resonant member comprises a main body and a projection that is integrally connected to and projects from the main body, and
the projection defines the capacitive surface portion of the resonant member.

6. The sensing device of claim 5, wherein:
the projection extends from the main body along a node axis of the resonant member,
the projection includes a proximal end portion and a distal end portion, the distal end portion being wider than the proximal end portion, and
the distal end portion defines the capacitive surface portion of the resonant member.

7. The sensing device of claim 6, wherein the proximal end portion of the projection is connected to a portion of the main body that displaces in a direction substantially parallel to the node axis in the second mode.

8. The sensing device of claim 1, wherein the resonant member comprises a main body and the capacitive surface portion of the resonant member is a recessed surface portion of the main body.

9. The sensing device of claim 1, further comprising:
a substrate;
an anchor that supports the resonant member relative to the substrate; and
a decoupling mechanism for flexibly decoupling the resonant member from the anchor, wherein the decoupling mechanism comprises a flange connected to the anchor, a ring portion, a plurality of first elastic portions that connect the ring portion to the flange, and a plurality of second elastic portions that connect the ring portion to the resonant member, and each of the first elastic portions has a stiffness that is less than a stiffness of each second elastic members.

10. A gyroscope comprising the sensing device of claim 1.

11. A sensing device comprising:
a resonant member that is movable in a first mode and a second mode; and
an electrode,
wherein the electrode is located between two capacitive surface portions of the resonant member such that one of the resonant member's two capacitive surface portions faces and is capacitively coupled to one capacitive surface portion of the electrode and the other of the resonant member's two capacitive surface portions faces and is capacitively coupled to another capacitive surface portion of the electrode, and
displacement for each point along each of the two capacitive surface portions of the resonant member is substantially tangent to the point in the first mode.

12. The sensing device of claim 11, wherein:
the electrode and resonant member define a capacitive channel therebetween, and
the two capacitive surface portions of the resonant member respectively define two end portions of the capacitive channel.

13. The sensing device of claim 11, wherein:
the resonant member comprises a main body and two projections that are integrally connected to and project from the main body,
the electrode is located between the two projections,
one of the two projections defines one of the two capacitive surface portions of the resonant member, and the other of the two projections defines the other of the two capacitive surface portions of the resonant member.

14. The sensing device of claim 11, wherein the resonant member comprises a main body and each capacitive surface portion of the resonant member corresponds to a recessed surface portion of the main body.

15. The sensing device of claim 11, wherein the electrode is located along a node axis of the resonant member.

16. A sensing device comprising:
a resonant member that is movable in a first mode and a second mode, the resonant member including a main body and a projection that extends from the main body along a node axis of the resonant member,
wherein the projection includes a proximal end portion and a distal end portion, the distal end portion being wider than the proximal end portion, and
wherein displacement for each point along the capacitive surface portion of the resonant member is substantially tangent to the point in the first mode.

17. The sensing device of claim 16, wherein the capacitive surface portion of the resonant member is curved.

* * * * *